H. I. McCONNELL.
COTTON PICKING MACHINE.
APPLICATION FILED APR. 28, 1908.
924,181.
Patented June 8, 1909.
2 SHEETS—SHEET 2.
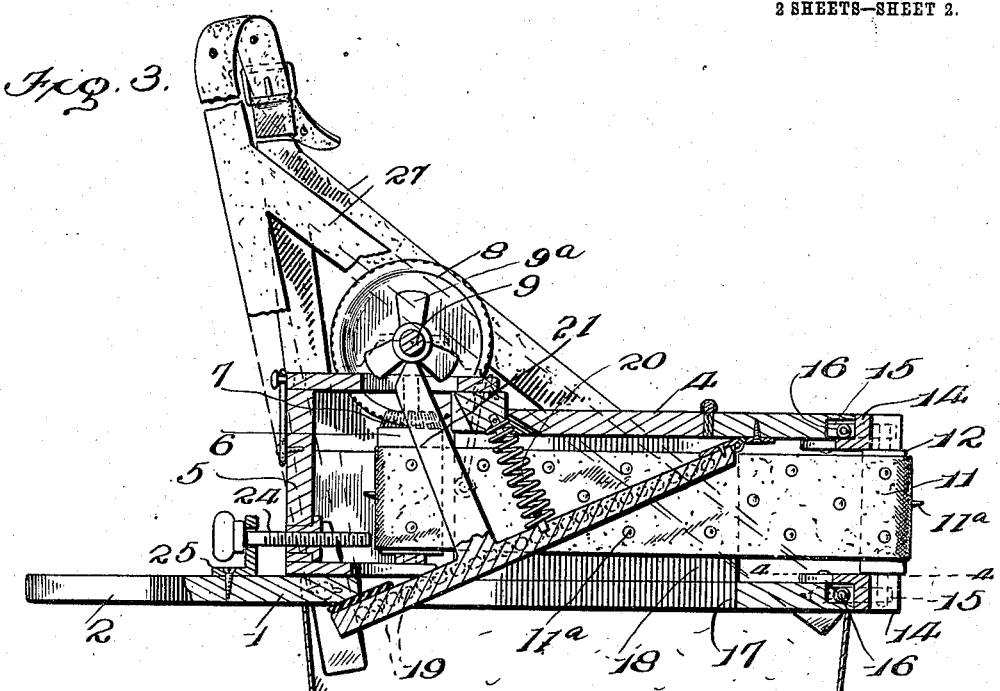
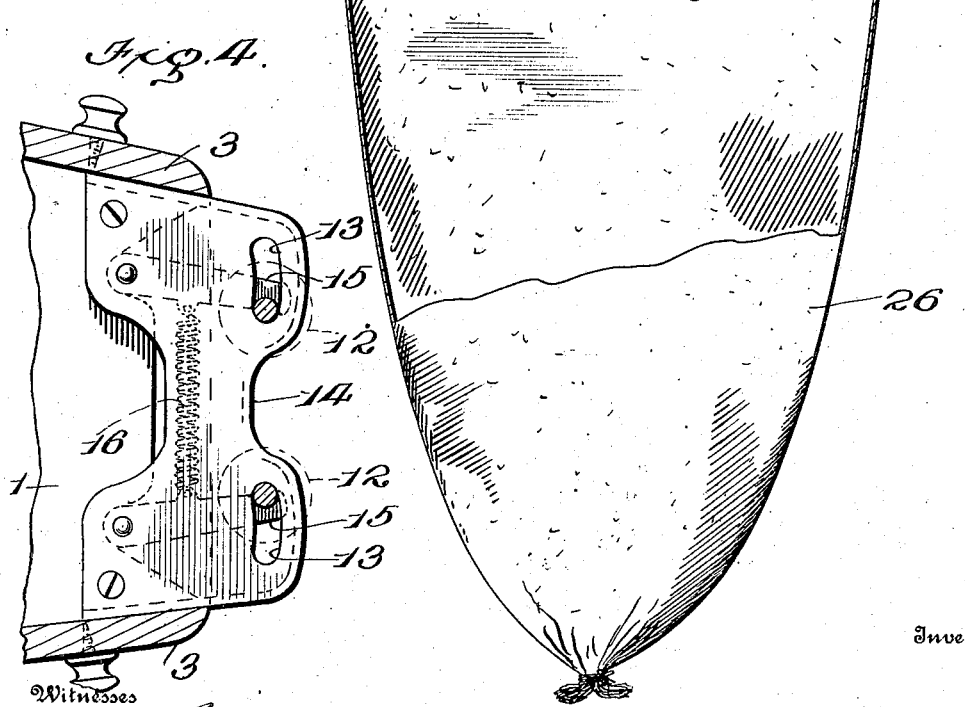

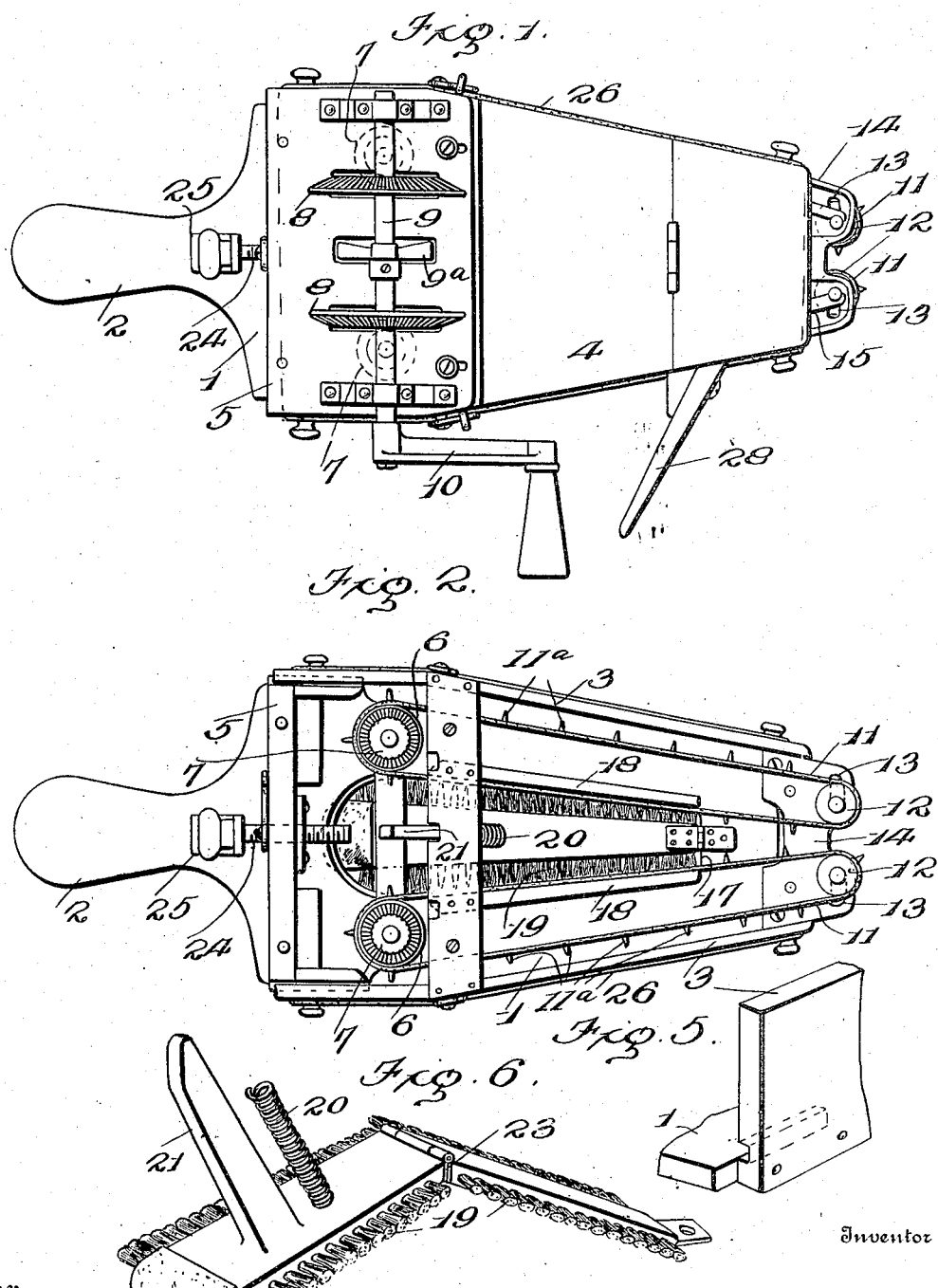

UNITED STATES PATENT OFFICE.

HOWARD I. McCONNELL, OF ATLANTA, GEORGIA, ASSIGNOR OF ONE-FOURTH TO PEYTON H. SNOOK, JR., AND ONE-FOURTH TO HUGH H. McCONNELL, OF ATLANTA, GEORGIA.

COTTON-PICKING MACHINE.

No. 924,181.      Specification of Letters Patent.      Patented June 8, 1909.

Application filed April 28, 1908. Serial No. 429,681.

*To all whom it may concern:*

Be it known that I, HOWARD I. McCONNELL, citizen of the United States, residing at Atlanta, in the county of Fulton and State of Georgia, have invented certain new and useful Improvements in Cotton-Picking Machines, of which the following is a specification.

This invention comprehends certain new and useful improvements in cotton picking devices, and the invention has for its object, a simple, durable and efficient construction of hand device of this character which may be cheaply manufactured, and easily operated by the cotton picker as he traverses the fields to pick the cotton from the growing plants and automatically deposit it into a sack connected to the cotton picking device.

With these and other objects in view that will more fully appear as the description proceeds, the invention consists in certain constructions, arrangements, and combination of the parts that I shall hereinafter fully describe and then point out the novel features in the appended claims.

For a full understanding of the invention, reference is to be had to the following description and accompanying drawings in which:

Figure 1 is a top plan view of a cotton picking device constructed in accordance with my invention; Fig. 2 is a similar view with the top plate removed; Fig. 3 is a longitudinal sectional view; Fig. 4 is a detail view on an enlarged scale of one of the supporting brackets for the front rollers, the view being taken substantially on the line 4—4 of Fig. 3; Fig. 5 is a detail perspective view of one corner of the casing; and, Fig. 6 is a detail perspective view of a modified form of brush.

Corresponding and like parts are referred to in the following description and indicated in all the views of the drawings by the same reference characters.

The casing of my improved cotton picking device embodies a bottom 1 the rear end of which forms a handle 2, sides 3 that converge forwardly, an open front end as shown, and a top 4. Within the rear end of the casing a slide 5 is detachably mounted and the said slide constitutes the rear end of the casing and the rear portion of the top. The slide 5 carries two vertically disposed and laterally spaced rollers 6 which are surmounted by beveled pinions 7 movable therewith. Gear wheels 8 mesh with the pinions 7, said wheels being mounted upon a transversely extending shaft 9 to one end of which a crank handle 10 is connected, as shown, said shaft being journaled in brackets upon the top of the slide 5. Belts 11, carrying and provided with picker teeth 11$^a$ and constituting the picking mechanism of the device, travel around the rollers 6 and also around the corresponding rollers 12 journaled in the front open end of the casing. These last named rollers have their ends mounted in transversely elongated slots 13 formed in upper and lower brackets 14 secured to the top and bottom of the casing and projecting forwardly therefrom, so that the front rollers 12 are permitted to have a lateral movement. The journal ends or trunnions of the rollers 12 are engaged by fingers 15, that are pivotally mounted within the respective brackets 14 and that are connected together by means of springs 16, so as to press the rollers inwardly in the slots 13 and permit a lateral and outward movement of the rollers. By this means, it will be seen that the belts at the front end of the casing where they form the mouth of the picking mechanism may yield to laterally extend said mouth so as to accommodate the plants fed therein so as to strip the cotton from the stalks.

The bottom 1 of the casing is formed with a longitudinally extending opening 17 and on each side of said opening are vertically disposed and longitudinally extending partition walls 18 with which the inner stretches of the two belts contact.

A brush 19 formed with two oppositely extending sets of bristles as shown, has a jointed connection at one end with the top 4 near the forward end thereof, and is connected near its rear end by means of a coil spring 20 or the like to some relatively stationary portion of the casing so as to support the brush for a yielding or jigging movement at right angles to the movement of the belts. In order to effect the movement of the brush as the device operates, the brush is formed near its rear end with an upwardly extending arm 21 and a series of tappets 9$^a$ is mounted on the shaft 9, said tappets being designed to strike the upwardly projecting end of arm 21 as the shaft rotates. If desired, the brush may be jointed intermediate of its ends as indicated at 23 in Fig. 6, the forward end being connected to the bottom of the casing instead of the top.

The tension of the belts may be increased by means of an adjusting screw 24 which is secured to the rear end of the slide 5 and which is mounted for bearing in a bracket 25 secured to the rear end of the base or bottom 1.

In order to catch the cotton that is picked from the growing plants, or stripped therefrom by the action of the belts, a sack 26 is suspended from the casing in any desired detachable way.

27 designates shoulder straps by which the device may be carried on the shoulders of the picker.

28 designates a guard which is secured to one of the sides 3 of the casing in advance of the crank handle and which is designed to shield the picker's hands from contact with the plants in the picking operation.

In the practical operation of my improved cotton picking device, the operator grasps the handle 2 with his left hand and operates the crank handle 10 with his other hand so as to effect a movement of the picker belts 11 to strip the cotton from the stalks and the cotton is carried rearwardly in the casing and is cleared from the belts by the vertical jigging movement of the clearing brush 19. The cotton that is picked falls into the sack 26 and after one sack has been filled it may be easily detached from the casing and an empty sack secured thereto in its place.

Having thus described the invention, what is claimed as new is:

1. An apparatus of the character described, formed with a longitudinally extending bottom opening and an open front end, two picker belts mounted to run in said casing, means for imparting a movement to said belts, a brush mounted in the casing in engagement with the inner portions of the belts, and means for imparting a jigging movement to said brush in a direction at right angles to the movement of the belts.

2. An apparatus of the character described, comprising a casing formed with an opening at its front end, and with a bottom discharge opening, belts mounted in the casing with their inner portions in proximity to said bottom opening, means for supporting said belts, said supporting means being laterally movable at the front end of the casing and means for imparting movement to said belts.

3. An apparatus of the character described, comprising a casing formed with a longitudinally extending bottom opening and an open front end, belts mounted in the casing with their inner portions in proximity to said bottom opening, front and rear rollers supporting said belts, a yieldable mounting for the front rollers, and means for imparting movement to said belts.

4. An apparatus of the character described, comprising a casing, belts mounted in said casing, front and rear rollers supporting said belts, brackets secured to the front end of the casing and formed with laterally elongated slots, the front rollers being formed with trunnions mounted in said slots, fingers pivoted in the front of the casing, and engaging the outer sides of said trunnions, springs secured to said fingers and exerting an inward tension upon said fingers, and means for driving said belts.

5. An apparatus of the character described, comprising a casing formed with a bottom opening and an open front end, belts mounted to run in said casing with their inner portions in proximity to said bottom opening, means for actuating said belts, said means including a drive shaft, tappets secured to said drive shaft, a brush mounted for vertical movement in the casing between the inner portions of the belts, means for yieldingly supporting said brush, and an arm secured to the brush and arranged for engagement with said tappets.

6. An apparatus of the character described, comprising a casing formed with an opening at its front end, and with a bottom discharge opening, belts mounted to run in said casing with their inner portions spaced from each other and in proximity to said bottom opening, the casing being provided with partition walls extending along the side edges of said bottom opening, and the belts bearing against said partition walls, and means for actuating said belts.

7. An apparatus of the character described, comprising a casing formed with an opening at its front end and with a bottom discharge opening, picker belts mounted in said casing with their inner portions in proximity to said bottom opening, the casing being provided with a partition wall between and against which the inner edges of said belts run, means for actuating said belts, a brush mounted between said walls, and means for imparting movement to the brush at right angles to the movement of the belts.

8. An apparatus of the character described, comprising a casing formed with a receiving opening and a discharge opening, belts mounted to run in said casing, means for actuating said belts, said means including a drive shaft, tappets carried by said shaft, a brush mounted in the casing between the inner portions of the belts, and movable in a direction at right angles to the movement of said belts, means for yieldingly supporting said brush, and an arm secured to the brush and arranged for engagement with said tappets.

9. An apparatus of the character described, comprising a casing formed with a receiving opening and a discharge opening, belts mounted to run in said casing, means for actuating said belts, said means including a drive shaft, a brush mounted for movement in the casing between the inner portions of the belts and at right angles to the movement of said inner portions, and means carried by the drive shaft for imparting a jigging movement to said brush.

10. An apparatus of the character described, comprising a casing provided with a receiving opening and a discharge opening, belts mounted in said casing with their inner portions in proximity to said discharge opening, front and rear rollers around which said belts run, the rear rollers being provided with bevel pinions, a drive shaft journaled on said casing, gear wheels mounted on said drive shaft and meshing with said pinions, tappets carried by said shaft, and a yieldable brush mounted in said casing between the inner portions of said belts and provided with an outwardly projecting arm designed for engagement by said tappets.

In testimony whereof I affix my signature in presence of two witnesses.

HOWARD I. McCONNELL. [L. S.]

Witnesses:
D. N. RIGGS,
H. M. MOODY, Jr.